United States Patent [19]

Branch

[11] 4,172,389
[45] Oct. 30, 1979

[54] TEMPERATURE COMPENSATED BRIDGE CIRCUIT

[75] Inventor: Howard R. Branch, Northfield, Conn.

[73] Assignee: American Chain & Cable Company, Inc., Bridgeport, Conn.

[21] Appl. No.: 886,118

[22] Filed: Mar. 13, 1978

[51] Int. Cl.² .............................................. G01B 7/16
[52] U.S. Cl. ..................................................... 73/766
[58] Field of Search .................... 73/1 R, 1 B, 88.5 R, 73/88.5 SD, 766

[56] References Cited

U.S. PATENT DOCUMENTS

| | | | |
|---|---|---|---|
| 2,980,852 | 4/1961 | Mell | 73/88.5 R X |
| 3,245,252 | 4/1966 | First et al. | 73/88.5 R |
| 3,448,607 | 6/1969 | Russell | 73/88.5 R |
| 3,922,597 | 11/1975 | Nagase | 73/88.5 R X |
| 4,000,643 | 1/1977 | Pearson | 73/88.5 R |

Primary Examiner—Gerald Goldberg
Assistant Examiner—Joseph W. Roskos
Attorney, Agent, or Firm—Pennie & Edmonds

[57] ABSTRACT

The voltage drops across a series-connected pair of strain gauges and arbitrary resistance are measured at zero and maximum stresses at three temperatures. The appropriate resistance for span compensation at the two extreme temperatures is then calculated from these values. The span compensation resistance is then distributed between a first resistor connected in series with one of the strain gauges and a second resistor connected in series with the other strain gauge. Initially, the first resistor is assigned a value of one ohm and the second resistor the remainder. With these values the series/parallel resistances required for temperature compensation at zero stress are calculated for the two extreme temperatures. The outputs at zero stress are then calculated for both the maximum temperature and the intermediate temperature and the difference between these outputs is obtained. Next, the resistance of the first resistor is increased by one ohm and the series/parallel resistances required for temperature compensation are again calculated for the extreme temperatures. From these values the outputs at zero stress are calculated for both the maximum and intermediate temperatures. The difference between these outputs is then compared with the difference previously calculated, and whichever value is closer to zero is retained along with the necessary circuit parameters. This process is repeated for each value of the first resistor less than the span resistance, so that the retained circuit parameters define the resistance values which produce the best three-point temperature compensation.

21 Claims, 3 Drawing Figures

TEMPERATURE COMPENSATED BRIDGE CIRCUIT

BACKGROUND OF THE INVENTION

This relates to the compensation of divider circuits for changes in resistance due to one or more environmental factors. Because the use of such circuits with strain gauges is of primary interest, the invention will be described in terms of such application. In will be recognized, however, that the principles disclosed may have application to other circuits.

A strain gauge is typically used by bonding it to a flexible object and measuring the change in voltage across the gauge or the change in gauge resistance as different loads are applied to the object. It is particularly advantageous to use a Wheatstone bridge in which two strain gauges are connected in series on one side of the bridge and two resistors are connected in series on the other side. Each of these four elements is in a separate diagonal of the bridge with the supply voltage applied to the nodes between the two arms and the output voltage measured between the node between the two resistors and the node between the two strain gauges. If the gauges are mounted on opposite sides of the object so that bending of the object applies tensile loading to one gauge and compressive loading to the other, the ratio of the resistance of the two strain gauges is a function of the amount of deflection in the object. Hence, the output voltage can be related to the amount of deflection in the object.

As is well known, strain gauges have both a temperature coefficient of resistance and a temperature coefficient of gauge factor or sensitivity. Thus, both their resistance and their rate of change of resistance with applied stress vary with temperature. Strain gauges can be made so that these temperature coefficients in different devices are approximately the same. However, when the gauges are bonded to an object, certain uncontrollable temperature induced strains are created that modify the temperature coefficients of resistance and sensitivity of the gauges. As a result, the voltage output from the bridge is a function of temperature.

Typically, this variation in output voltage because of changes in resistance with temperature is compensated by measuring the resistance of the gauges under zero stress at two temperatures and selecting a series/parallel network of resistance for one gauge which offsets the effects of its temperature coefficient of resistance enough that the ratio of the resistance in the two strain gauge diagonals at the two compensation temperatures is identical. This process is called temperature compensation or constant value compensation hereinafter. While this temperature compensation does improve the performance of the circuit as a measuring device, it does not guarantee that the resistance ratios are the same at any other temperature because of the complex effects of the temperature induced strain in the gauges. Moreover, no correction is made by this temperature compensation process for the variation in output voltage because of change in sensitivity with temperature.

The variation in output voltage because of change in sensitivity with temperature may be compensated by introducing a resistor in series with the bridge. The value of this resistor is selected to balance the temperature coefficient of sensitivity. More particularly, once the bridge is temperature compensated at its two compensation temperatures, its output voltage is measured at these two temperatures with maximum deflection being applied to the object on which the gauges are mounted. The series resistor is then selected so that the output voltage under this condition is the same at both compensation temperatures. This process is called span compensation.

SUMMARY OF THE INVENTION

To provide for improved compensation in the bridge circuit, I have devised a method of designing the circuit which compensates for temperature effects at three different points.

Illustratively, I start with a bridge circuit comprising two series resistors in one arm and an arbitrary resistance in series with two strain gauges in the other. For this circuit I measure the voltage drop across the strain gauges and arbitrary resistance at zero and maximum stresses at three temperatures. From these values, I calculate the appropriate resistance for span compensation at the two extreme temperatures.

Next, I begin an iterative process to distribute the span compensation resistance between a first span compensation resistor connected in series with one of the strain gauges in one diagonal of the bridge circuit and a second span compensation resistor connected in series with the other strain gauge in a second diagonal of the bridge circuit. Initially, I assign the value of one ohm to the first resistor and the remainder of the span compensation resistance to the second resistor. With these values, I calculate the series/parallel resistances required for temperature compensation at the two extreme temperatures. I then calculate the outputs at zero stress for both the maximum temperature and the intermediate temperature and take the difference between these values. This difference, the values of the first and second span compensation resistors, and the values of the series/parallel resistances are retained.

Next, I increment the resistance of the first span compensation resistor by one ohm, decrement the resistance of the second resistor by one ohm, and again calculate the series/parallel resistances required for temperature compensation at the two extreme temperatures. From these values, I again calculate the output at zero stress at both the maximum and intermediate temperatures. The difference between these outputs is then compared with the difference previously calculated and whichever value is closer to zero is retained along with the circuit parameters required to achieve it.

The first span compensation resistor is then incremented by one ohm and the foregoing process is repeated until the value of the first span compensation resistor reaches the span resistance. At that point, the retained circuit parameters define the resistance values of the bridge circuit which produce the best three-point temperature compensation.

BRIEF DESCRIPTION OF THE DRAWING

The nature, advantages, and various features of my invention will appear more fully upon consideration of the illustrative embodiment now to be described in detail in connection with the drawing in which.

DETAILED DESCRIPTION OF THE INVENTION

Figure 1:
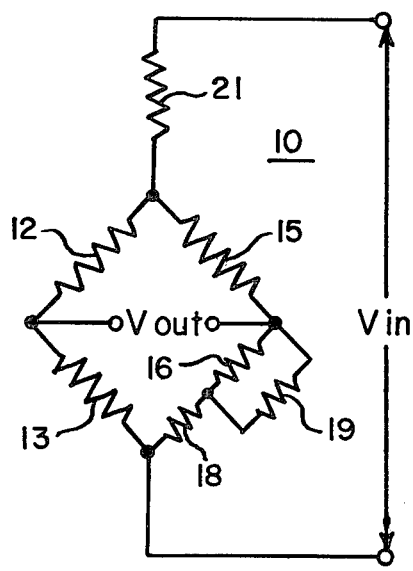
FIG. 1 is a block diagram of a prior art bridge circuit.

FIG. 1 depicts a typical bridge circuit 10 of the prior art. In one arm of the bridge are first and second resistors 12, 13 connected in series. In the other arm are first and second strain gauges 15, 16, likewise connected in series. To provide for temperature compensation at two temperatures in an illustrative bridge a third resistor 18 is connected in series with second strain gauge 16 and a fourth resistor 19 is connected in parallel thereto. Span compensation is provided by a fifth resistor 21 connected in series with the bridge circuit.

Figure 2:
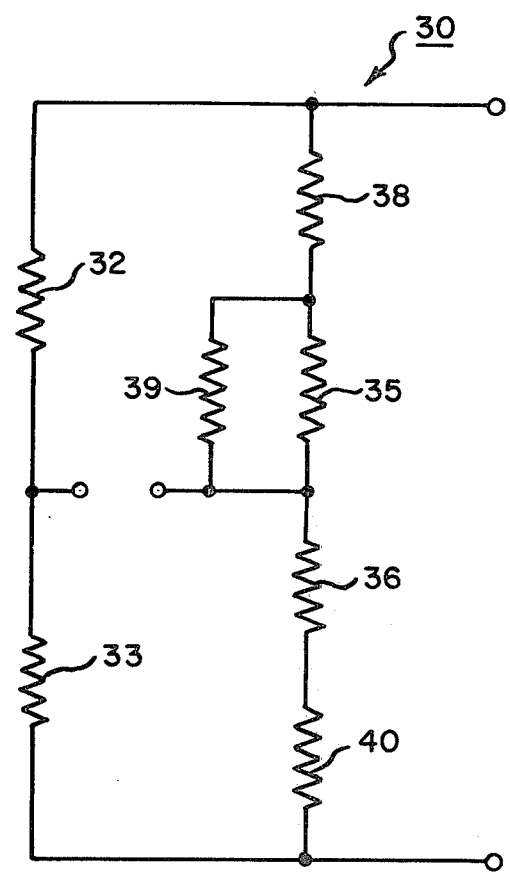
FIG. 2 is an illustrative embodiment of a bridge circuit in accordance with my invention.

As shown in FIG. 2, in an illustrative bridge circuit 30 of my invention, temperature compensation and span compensation are provided by resistors in the same arm of the bridge as the strain gauges. In one arm of the bridge are first and second resistors 32, 33. In a first diagonal of the other arm are a first strain gauge 35, connected in series with a third resistance 38. A fourth resistor 39 is connected in parallel across gauge 35. In a second diagonal of this arm, a second strain gauge 36 is connected in series with a fifth resistor 40. The strain gauges are mounted on opposite sides of a flexible object so that bending of the object applies tensile loading to one gauge and compressive loading to the other resulting in approximately equal resistance changes in each gauge but of opposite polarity. An example of such a mounting is shown in U.S. patent application Ser. No. 885,079, filed Mar. 9, 1978, by Birger B. Gabrielson for "Differential Pressure Sensor With Dual Level Overrange Protection" and assigned to the same assignee, which application is incorporated herein by reference. The resistance values of the three resistors 38, 39, 40 are selected as will be described below to provide both for span compensation at two extreme temperatures and for temperature compensation at three temperatures.

Figure 3:
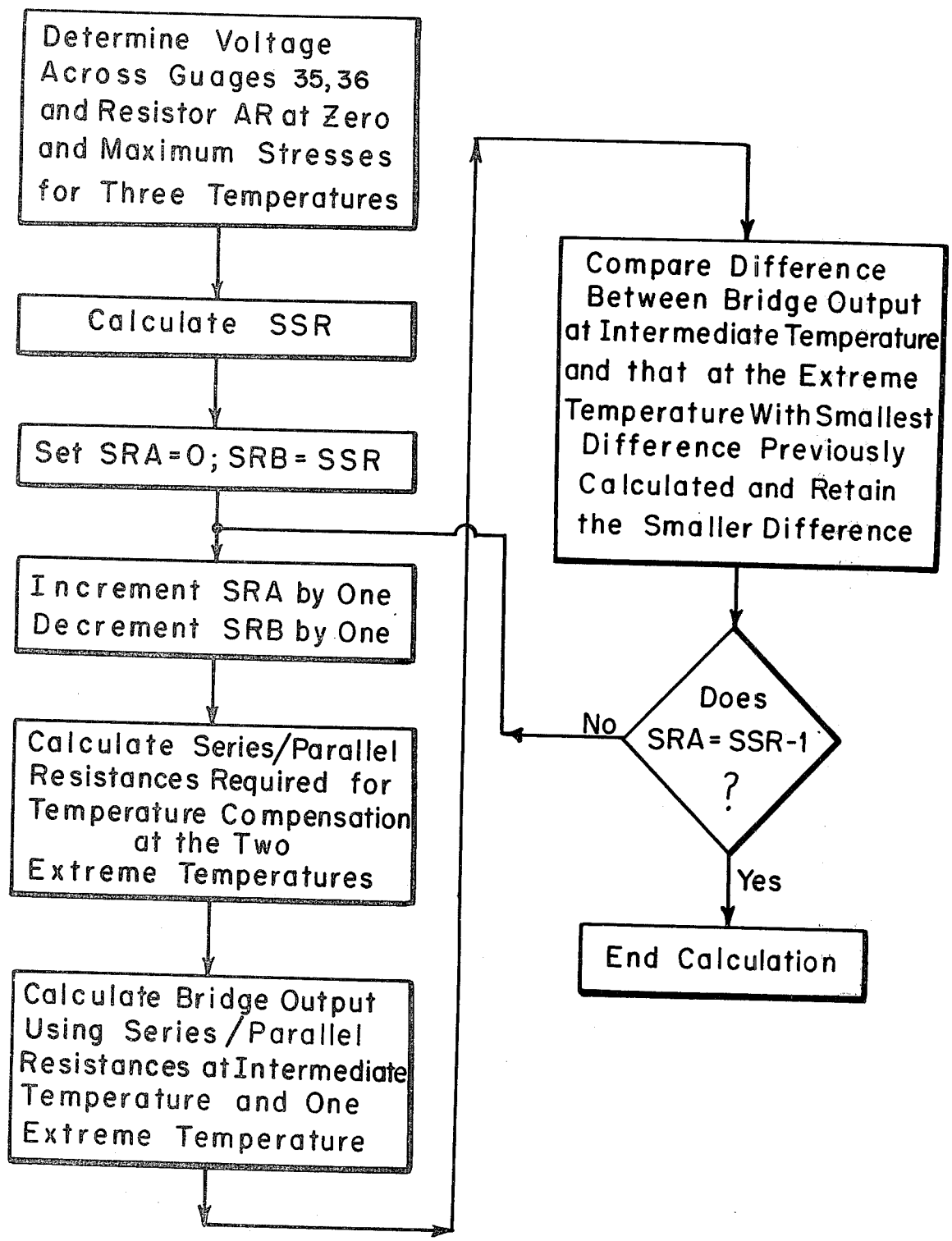
FIG. 3 is a flow chart of the steps used in calculating the resistance values of several resistors depicted in FIG. 2.

As shown in the flow chart of FIG. 3, to determine the values of resistors 38, 39, 40, and relative position in the circuit I start with a bridge circuit having first and second resistors 32, 33 connected in series in one arm and strain gauges 35, 36 and an arbitrary resistance AR connected in series in the other arm. For this circuit, I measure the voltage drop across each gauge 35, 36 and that across arbitrary resistance AR at zero stress and at maximum stress for three different temperatures. As will be apparent from the description of the mounting of the strain gauges, the condition of maximum stress means maximum tension for one gauge and maximum compression for the other. From these values I then calculate the appropriate resistance SSR for span compensation at the two extreme temperatures of the three temperatures measured using the following equations:

$$SSR = \frac{VBR(H,S) - VBR(C,S) \cdot (VO(H)/VO(C))}{iBR(C,S) \cdot (VO(H)/VO(C)) - iBR(H,S)}$$

where
VBR(H,S)=VGA(H,S)+VGB(H,S)
VBR(C,S)=VGA(C,S)+VGB(C,S)
VO(H)=(AR+GA(H,Z))iBR(H,Z)−(AR+GA(H,S))iBR(H,S)
VO(C)=(AR+GA(C,Z))iBR(C,Z)−(AR+GA(C,S))iBR(C,S)
iBR(H,Z)=VAR(H,Z)/AR
iBR(H,S)=VAR(H,S)/AR
iBR(C,Z)=VAR(C,Z)/AR
iBR(C,S)=VAR(C,S)/AR
H=the uppermost of the three temperatures
C=the lowermost of the three temperatures
Z=zero stress
S=maximum stress and VGA and VGB are the measured voltage drops across gauges 35, 36, respectively, at the temperatures and stresses indicated; VAR is the measured voltage drop across the arbitrary resistance AR at the temperatures and stresses indicated; and GA is the resistance of gauge 35 at the temperatures and stresses indicated. As will be evident, the resistance of gauges 35, 36 can readily be determined from the measured voltage drop across each gauge and the current flow iBR in that arm of the bridge at the temperatures and stresses of interest.

Next, I begin an iterative process to find the optimum distribution of the span resistance between resistors 38, 40. Initially, I assume that the resistance of resistor 38 is an arbitrary value such as one ohm and that the resistance of resistor 40 is the remainder of the span resistance. With these values, I calculate the values of a series/parallel resistance network that are required for temperature compensation at each of the two extreme temperatures H, C. More specifically, I calculate the ratios of the resistance GA+SRA in the first diagonal of the bridge to the resistance GB+SRB in the second diagonal at the hot and cold temperatures and zero stress, where GA and GB are the resistances of gauges 35, 36 at the temperatures and stresses indicated, SRA is the resistance assigned to resistor 38 and SRB is the resistance assigned to resistor 40. As is well known in the art, for two point temperature compensation, the ratios should be the same.

If, however, $$\frac{GA(H) + SRA}{GB(H) + SRB} > \frac{GA(C) + SRA}{GB(C) + SRB},$$

resistance must be added to GA(C)+SRA to compensate.
If $$\frac{GA(H) + SRA}{GB(H) + SRB} < \frac{GA(C) + SRA}{GB(C) + SRB},$$

resistance must be added to GB(C)+SRB to compensate.

For purposes of discussion, let us assume that resistance must be added to GA(C)+SRA. Using well known two point temperature compensation procedures, the resistance RY of parallel resistor 39 can be calculated to be:

$$RY = \frac{(C - A)(A + D) - \sqrt{(A - C)(A - D)((A - C)(A - D) + 4AD))}}{2(D - C)}$$

and the resistance RX of an additional series resistance in series with resistor 38 can be calculated to be:

$$RX = A - \frac{A \cdot RY}{A + RY}$$

where

-continued $$A = GA(H,Z)$$
$$C = \left( \frac{(GB(C,Z) + SRB)}{(GB(H,Z) + SRB)} \cdot (A + SRA) \right) - SRA$$
$$D = GA(C,Z)$$

where GA and GB are the resistances of gauges 35, 36, respectively, at the temperatures and stresses indicated and SRA and SRB are the resistances of resistors 38 and 40, respectively. RX and RY cancel each other out at the uppermost temperature H so that the resistance in the arm of the bridge where the strain gauges are located remains unchanged. At the lowermost temperature C, these values provide an additional resistance sufficient to equalize the ratios of the resistance in the first diagonal and the resistance in the second diagonal for the two temperatures H and C. If, instead, the resistance had to be added to GB(C)+SRB, the equations would be similar with the substitution of GA, GB and SRA for GB, GA and SRB of the above equations.

Next, the voltage V at the node 42 between the two strain gauge diagonals of the compensated bridge circuit is calculated at the intermediate temperature and the uppermost temperature using the relation:

$$V = VS \frac{(ESRA + RGA)}{(ESRA + EGA + GB + SRB)}$$

where
VS = the voltage across the bridge circuit
ESRA = SRA + RX
EGA = (GA)(RY)/(GA+RY)
and GA and GB are the resistance of strain gauges 35, 36 at zero stress for each of the temperatures for which the calculation is made.

The difference DV between the voltage V at the intermediate temperature and the voltage V at the uppermost temperature is then determined. During the first run of the iterative process, this difference is retained along with the values SRA, SRB, RX and RY.

The value of SRA is then tested to determine if

SRA = SSR − 1.

During the first run of the process this test will not be met. Accordingly, the value of SRA is incremented by one ohm and that of SRB is decremented by one ohm and the series/parallel resistances required for temperature compensation are calculated for the extreme temperatures using the foregoing equations for RX and RY, the measured values of the gauge resistances GA, GB and the new value of SRB or SRA as circumstances require. From these values the voltage V is calculated at the intermediate temperature and the uppermost temperature using the relation set forth above and the difference DV between these voltages is taken. This difference is then compared with the difference previously calculated and whichever value is closer to zero is retained along with the circuit parameters SRA, SRB, RX and RY needed to produce said difference.

The foregoing process is repeated for each value of SRA less than SSR. Once these calculations are completed, the difference DV which is retained is the closest value to zero for each of the values of SRA in one ohm increments between zero and SSR. Hence, the circuit parameters associated with that value DV produce the best three-point temperature compensation.

Using these values, the resistances of the bridge network of FIG. 2 are then set.

As will be apparent, the above-identified calculations can be made by hand or machine. If desired, the calculation process can readily be implemented in any number of small computers commercially available. The creation of a suitable program for making such calculations will be evident to any programmer in light of the discussion above.

My invention is not limited to the specific circuit described above. The use of a bridge circuit as shown in FIG. 2 is only illustrative because the function of resistors 32, 33 is merely to provide a reference voltage. Thus, my invention may be practiced in any voltage divider circuit in which there are two elements having an appreciable temperature co-efficient of resistance. Even more generally, my invention may be practiced using any divider circuit made of elements having a resistive, capacitive or inductive effect for which at least two of such elements have an output which is a function of two variables. In such circumstances the span compensation process described above is used to calculate the value of a fixed electrical element such that at a first value of one variable the difference in the output between two values of the second variable is the same as the difference in the output between the same two values of the second variable at a second value of the first variable. The process of temperature (or constant value) compensation is then used to minimize the differences in the output of the circuit at three values of the first variable and a constant value of the second variable. From the foregoing description, the implementation of my invention in these circumstances will be evident to those skilled in the art. This compensation method may also be practiced using a constant current source in place at voltage regulator 25 in which case the span compensation resistance is connected in parallel with the divider. The process for obtaining three point temperature compensation is similar. Initially, an arbitrary resistance is connected in series with the gauges; and the necessary span compensation resistance is calculated. I then go through the iterative process of distributing the arbitrary resistance between two resistances and calculating the resistance values of the series/parallel networks as described previously.

What is claimed is:
1. A method for compensating for temperature effects on strain gauges in a bridge circuit which comprises first and second resistors in one arm of the bridge circuit and first and second strain gauges in a second arm of the bridge circuit, said method comprising the steps of:
(a) measuring the voltage across said strain gauges at first and second stresses at first and second temperatures when said strain gauges are connected in said bridge circuit with a first value of series resistance in the arm of said bridge circuit in which said strain gauges are located;
(b) calculating a resistance which provides for span compensation between said first and second stresses at said first and second temperatures when said span compensation resistance is connected in said bridge in series with said strain gauges;
(c) calculating the resistances for a series/parallel network for one of said strain gauges which provides for temperature compensation at said first and second temperatures, assuming that a small portion of the span compensation resistance is in series with the first strain gauge in one diagonal of the arm in which the strain gauges are located and the remaining portion of the span compensation resistance is in series with the second strain gauge in a second diagonal of the arm in which the gauges are located;

(d) calculating the output from said bridge circuit at said first stress at both said second temperature and a third temperature between said first and second temperatures using the distribution of span compensation resistance assumed in step (c) and the series/parallel resistance calculated in step (c);

(e) repeating steps (c) and (d) for at least one other distribution of the span compensation resistance in said first and second diagonals;

(f) comparing the difference in the outputs of the bridge circuit at said second and third temperatures during one execution of step (d) with the difference in the outputs of said bridge circuit at said second and third temperatures during a second execution of step (d); and (g) using in the design of the bridge circuit the distribution of span compensation and the series/parallel resistance for which the difference in the outputs of the bridge circuit at said second and third temperatures is closer to zero.

2. The method of claim 1 wherein:

(a) during the first execution of step (c) the portion of the span compensation resistance connected in series with the first strain gauge is relatively small; and (b) step (e) comprises the steps of:
  (1) incrementing the resistance in series with the first strain gauge by a predetermined amount and decrementing the resistance in series with the second strain gauge an equal amount;
  (2) repeating steps (c) and (d) using the new values of said resistances determined by step (1); and
  (3) repeating steps (1) and (2) until the resistance in series with said first strain gauge approaches the total span compensation resistance.

3. A method for compensating for temperature effects on first and second strain gauges in a voltage divider circuit, said method comprising the steps of:

(a) measuring the voltage across said strain gauges and a first series resistance at first and second stresses at first and second temperatures;

(b) calculating a resistance which provides for span compensation between said first and second stresses at said first and second temperatures when said span compensation resistance is connected in series with said strain gauges;

(c) calculating the resistances for a series/parallel network for one of said strain gauges which provides for temperature compensation at said first and second temperatures, assuming that a small portion of the span compensation resistance is in series with the first strain gauge in one portion of the divider circuit and the remaining portion of the span compensation resistance is in series with the second strain gauge in a second portion of the divider circuit;

(d) calculating the voltage output at a node between said first and second portions of said divider circuit at said first stress at both said second temperature and a third temperature between said first and second temperatures using the distribution of span compensation resistance assumed in step (c) and the series/parallel resistances calculated in step (c);

(e) repeating steps (c) and (d) for at least one other distribution of the span compensation resistance in said first and second portions;

(f) comparing the difference in the outputs of the divider circuit at said second and third temperatures during one execution of step (d) with the difference in the outputs of said divider circuit at said second and third temperatures during a second execution of step (d); and (g) using in the design of the divider circuit the distribution of span compensation resistance and the series/parallel resistances for which the difference in the outputs of the divider circuit at said second and third temperatures is closer to zero.

4. The method of claim 3 wherein:

(a) during the first execution of step (c) the portion of the span compensation resistance connected in series with the first strain gauge is relatively small; and (b) step (e) comprises the steps of:
  (1) incrementing the resistance in series with the first strain gauge by a predetermined amount and decrementing the resistance in series with the second strain gauge an equal amount;
  (2) repeating steps (c) and (d) using the new values of said resistances determined by step (1); and
  (3) repeating steps (1) and (2) until the resistance in series with said first strain gauge approaches the total span compensation resistance.

5. A method for compensating for environmental effects on first and second electrical devices in a divider circuit, said devices having a resistive, capacitive or inductive output which is a function of two variables, said method comprising the steps of:

(a) measuring the resistance, capacitance or inductance across said devices at first and second values of the first variable and at first and second values of the second variable when said devices are connected in said divider circuit with an electrical element which has a resistive, capacitive or inductive output that is substantially constant with respect to said two variables;

(b) calculating a resistance, capacitance or inductance which provides for span compensation between said first and second values of the first variable at said first and second values of the second variable when said span compensation resistance, capacitance or inductance is connected in said circuit with said first and second electrical devices;

(c) calculating the resistances, capacitances, or inductances for a series/parallel network for one of said electrical devices which provides for compensation at said first and second values of said second variable, assuming that a small portion of the span compensation resistance, capacitance or inductance is connected with the first electrical device in one portion of the divider circuit and the remaining portion is connected with the second electrical device in a second portion of the divider circuit;

(d) calculating the output from said divider circuit at said first value of the first variable at both said second value of the second variable and a third value of the second variable between said first and second values using the distribution of span compensation, resistance, capacitance, or inductance assumed in step (c) and the series/parallel resistances, capacitances or inductances calculated in step (c);

(e) repeating steps (c) and (d) for at least one other distribution of the span compensation resistance, capacitance or inductance in said first and second portions of the divider circuit;

(f) comparing the difference in the outputs of the divider circuit at said second and third values of the second variable during one execution of step (d) with the difference in the outputs of said divider circuit at said second and third values of the second variable during a second execution of step (d); and (g) using in the design of the divider circuit the distribution of span compensation resistance, capacitance, or inductance and the series/parallel resistances, capacitances, or inductances for which the difference in the outputs of the divider circuit at said second and third values of the second variable is closer to zero.

6. The method of claim 5 wherein:

(a) during the first execution of step (c) the portion of the span compensation resistance, capacitance or inductance connected with the first electrical device is relatively small; and (b) step (e) comprises the steps of:

(1) incrementing the resistance, capacitance or inductance connected with the first electrical device by a predetermined amount and decrementing that connected with the second electrical device an equal amount;

(2) repeating steps (c) and (d) using the new values of said resistances, capacitances or inductances determined by step (1); and (3) repeating steps (1) and (2) until the resistance, capacitance or inductance connected with said first electrical device approaches the total span compensation resistance, capacitance or inductance.

7. A compensated divider circuit comprising a first resistance, a first strain gauge, a second strain gauge and a second resistance, all of which are connected in series, and a third resistance connected in parallel across one of the strain gauges, the sum of the first and second resistances being such as to provide for span compensation between first and second stresses at first and second temperatures, the third resistance and a portion of one of said first and second resistances being such as to provide for temperature compensation at said first and second temperatures, said first, second and third resistances being selected to provide for temperature compensation at a third temperature between said first and second temperatures.

8. A compensated divider circuit comprizing a first, second, third and fourth resistance all of which are connected in series, said third and fourth resistances being a function of two variables and said first and second resistances being constants with respect to the two said variables and a fifth resistance connected in parallel across one of said third and fourth resistances, said fifth resistance being constant with respect to said variables;

the sum of the first and second resistances being such as to provide for span compensation between the first and second values of said second variable, the fifth resistance and portion of one of said first and second resistances being such as to provide for substantially the same output at said first and second values of the second variable, said first, second and fifth resistances being selected to provide for substantially the same output at a third value of the second variable as at said first and second values of said second variable.

9. A compensated divider circuit comprising first, second, third and fourth resistances all of which are connected in series, said third and fourth resistances being a function of two variables, and a fifth resistance connected in parallel across one of said third and fourth resistances, the sum of the first and second resistances being such as provides approximately for span compensation at first and second values of said first variable, the fifth resistance and a portion of one of said first and second resistances being such as to provide for substantially the same output at (C, Z) and (H, Z), where C and H are said first and second values of the first variable and Z is a first value of said second variable, and said first, second and fifth resistances being selected to provide for substantially the same output at (M, Z), where M is a third value of the first variable, as at (H, Z).

10. A method for compensating for environmental effects on first and second electrical devices in a divider circuit, said devices having a resistive, capacitive or inductive output which is a function of two variables (X, Y), said method comprising the steps of:

(a) measuring the resistance, capacitance or inductance across said devices at (C, Z), (C, S), (H, Z) and (H, S), where C and H are first and second values of the first variable and Z and S are first and second values of the second variable, when said devices are connected in said divider circuit with an electrical element which has a resistive, capacitive or inductive output;

(b) calculating a resistance, capacitance or inductance which provides for span compensation at C and H when said span compensation resistance, capacitance or inductance is connected in said circuit with said first and second electrical devices;

(c) calculating the resistances, capacitances, or inductances for a series/parallel network for one of said electrical devices which provides for constant value compensation at C and H, assuming that a small portion of the span compensation resistance, capacitance or inductance is connected with the first electrical device in one portion of the divider circuit and the remaining portion is connected with the second electrical device in a second portion of the divider circuit;

(d) calculating the outputs from said divider circuit at (H, Z) and (M, Z), where M is a third value of the first variable between said first and second values, using the distribution of span compensation resistance, capacitance, or inductance assumed in step (c) and the series/parallel resistances, capacitances or inductances calculated in step (c);

(e) repeating steps (c) and (d) for at least one other distribution of the span compensation resistance, capacitance or inductance in said first and second portions of the divider circuit;

(f) comparing the difference in the outputs of the divider circuit at (H, Z) and (M, Z) during one execution of step (d) with the difference in the outputs of said divider circuit at (H, Z) and (M, Z) during a second execution of step (d); and (g) using in the design of the divider circuit the distribution of span compensation resistance, capacitance, or inductance and the series/parallel resistances, capacitances, or inductances for which the difference in the outputs of the divider circuit at (H, Z) and (M, Z) is closer to zero.

11. The method of claim 10 wherein:

during the first execution of step (c) the portion of the span compensation resistance, capacitance or inductance connected with the first electrical device is relatively small; and step (e) comprises the steps of:
(1) incrementing the resistance, capacitance or inductance connected with the first electrical device by a predetermined amount and decrementing that connected with the second electrical device an equal amount;
(2) repeating steps (c) and (d) using the new values of said resistances, capacitances or inductances determined by step (1); and
(3) repeating steps (1) and (2) until the resistance capacitance or inductance connected with said first electrical device approaches the total span compensation resistance, capacitance, or inductance.

12. The method of claim 10 wherein said first and second electrical devices are strain gauges having a resistance which varies with temperature and stress, said first variable is temperature and said second variable is stress.

13. The method of any one of claims 10, 11 or 12 wherein the step of calculating a span compensation resistance, capacitance or inductance uses the resistance, capacitance or inductance values measured by step (a).

14. The method of claim 1 further comprising the following step:
(h) measuring the voltage across said first value of series resistance identified in step (a) at first and second stresses at first and second temperatures.

15. The method of claim 14 wherein the step of calculating the span compensation resistance uses the values of voltage across said strain gauges that are measured by step (a) and the values of voltages across said first value of series resistance that are measured by step (h).

16. The method of claim 3 or claim 4 wherein the step of calculating the span compensation resistance uses the values of voltage across said strain gauges and said first series resistance that are calculated by step (a).

17. The method of claim 5 or claim 6 wherein the step of calculating a span compensation resistance, capacitance or inductance uses the resistance, capacitance or inductance values measured by step (a).

18. A compensated divider circuit comprising first, second, third, fourth and fifth resistances all of which are connected in series, said third and fourth resistances being a function of two variables, and a sixth resistance connected in parallel across one of said third and fourth resistances, the sum of the first and second resistances being such as to provide for span compensation at first and second values of said first variable, the fifth and sixth resistances being such as to provide for substantially the same output at (C, Z) and (H, Z), where C and H are said first and second values of the first variable and Z is a first value of said second variable, and said first, second, fifth and sixth resistances being selected to provide for substantially the same output at (M, Z), where M is a third value of the first variable, as at (H, Z).

19. A method for compensating for temperature effects on first and second strain gauges in a voltage divider circuit, said method comprising the steps of:

(a) measuring the voltage across said strain gauges and a first series resistance at first and second stresses at first and second temperatures;

(b) calculating a resistance which provides for span-compensation between said first and second stresses at said first and second temperatures when said span compensation resistance is connected in parallel with said strain gauges;

(c) calculating the resistances for a series/parallel network for one of said strain gauges which provides for temperature compensation at said first and second temperatures, assuming that a small portion of the first resistance is in series with the first strain gauge in one portion of the divider circuit and the remaining portion of the first resistance is in series with the second strain gauge in a second portion of the divider circuit;

(d) calculating the voltage output at a node between said first and second portions of said divider circuit at said first stress at both said second temperature and a third temperature between said first and second temperatures using the distribution of the first resistance assumed in step (c) and the series/parallel resistances calculated in step (c);

(e) repeating steps (c) and (d) for at least one other distribution of the first resistance in said first and second portions;

(f) comparing the difference in the outputs of the divider circuit at said second and third temperatures during one execution of step (d) with the difference in the outputs of said divider circuit at said second and third temperatures during a second execution of step (d); and (g) using in the design of the divider circuit the distribution of first resistance and the series/parallel resistances for which the difference in the outputs of the divider circuit at said second and third temperatures is closer to zero.

20. The method of claim 19 wherein:

(a) during the first execution of step (c) the portion of the first resistance connected in series with the first strain gauge is relatively small; and (b) step (e) comprises the steps of:
(1) incrementing the resistance in series with the first strain gauge by a predetermined amount and decrementing the resistance in series with the second strain gauge an equal amount;
(2) repeating steps (c) and (d) using the new values of said resistances determined by step (1); and
(3) repeating steps (1) and (2) until the portion of the first resistance in series with said first strain gauge approaches the value of the first resistance.

21. The method of claim 19 or claim 20 wherein the step of calculating the span compensation resistance uses the values of voltage across said strain gauges and said first series resistance that are calculated by step (a).

* * * * *